(12) United States Patent
So (10) Patent No.: US 7,889,745 B2
(45) Date of Patent: Feb. 15, 2011

(54) SYSTEMS AND METHODS FOR MULTI-LAYER INTERWORKING

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 12/039,845

(22) Filed: Feb. 29, 2008

(65) Prior Publication Data

US 2009/0219938 A1 Sep. 3, 2009

(51) Int. Cl.
*H04L 12/28* (2006.01)
(52) U.S. Cl. .............. 370/395.3; 370/231; 370/235; 370/252; 370/395.41; 370/468; 709/241
(58) Field of Classification Search .............. 370/395.3, 370/230, 231, 235, 252, 395.41, 468; 709/241
See application file for complete search history.

(56) References Cited

U.S. PATENT DOCUMENTS

| | | | | |
|---|---|---|---|---|
| 7,532,574 B1 * | 5/2009 | Madhwaraj et al. | ......... | 370/231 |
| 2002/0097671 A1 * | 7/2002 | Doverspike et al. | ......... | 370/216 |
| 2006/0256712 A1 * | 11/2006 | Imajuku et al. | ............. | 370/218 |
| 2007/0291775 A1 * | 12/2007 | Frantz | ........................ | 370/401 |
| 2008/0037553 A1 * | 2/2008 | Gilmartin et al. | ...... | 370/395.41 |
| 2008/0279103 A1 * | 11/2008 | Yong et al. | .................. | 370/235 |

* cited by examiner

*Primary Examiner*—Ricky Ngo
*Assistant Examiner*—Luat Phung (57) ABSTRACT

Systems, modules, computer-readable mediums and methods for multi-layer interworking are provided. An identified traffic path is selected from one or more traffic paths. The identified traffic path is selected based on information indicative of traffic path parameter information associated with the identified traffic path relative to traffic path parameter information associated with the other traffic paths. A transport trail is identified from one or more transport trails. Whether the identified transport trail from one or more transport trails is suitable for assignment is determined. The determination is made based on information indicative of the transport trail parameter information associated with the identified transport trail relative to transport trail parameter information associated with the other transport trails. The selected identified traffic path is assigned to the identified transport trail if the identified transport trail is determined to be suitable for assignment.

18 Claims, 5 Drawing Sheets

SYSTEMS AND METHODS FOR MULTI-LAYER INTERWORKING

BACKGROUND INFORMATION

Conventional communication systems include numerous layers of functionality for the provisioning of information, in general, and for the transportation of information, in particular. Conventional systems include lower-complexity layers that do not differentiate between types of information or the manner in which the information should be transported. These layers provide a mere pipeline for information. Conventional systems also include higher-complexity layers that process a number of parameters to meet the different service requirements of the information being transported. Such processing can result in undesirable system complexity and expense. For example, ATM, Frame Relay and MPLS protocols operate at higher complexity layers and may be overly complex and expensive in certain contexts.

Recommendations for information transportation standards such as International Telecommunication Union-Telecommunication ("ITU-T") G.800 and G.800v2 are currently being developed. The ITU-T Composite Transportation Group ("CTG") is particularly directed to providing new solutions for transportation standards. The standards, however, currently rely on traditional models of layering and functionality in communication systems and accordingly suffer from the aforementioned drawbacks.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

DETAILED DESCRIPTION OF EXEMPLARY EMBODIMENTS

In exemplary embodiments, systems, modules, computer-readable mediums and methods for multi-layer interworking are provided. An identified traffic path is selected from one or more traffic paths. The identified traffic path is selected based on information indicative of traffic path parameter information associated with the identified traffic path relative to traffic path parameter information associated with the other traffic paths. A transport trail is identified from one or more transport trails. Whether the identified transport trail from one or more transport trails is suitable for assignment is determined. The determination is based on information indicative of the transport trail parameter information associated with the identified transport trail relative to transport trail parameter information associated with the other transport trails. The selected identified traffic path is assigned to the identified transport trail if the identified transport trail is determined to be suitable for assignment.

In exemplary embodiments, after one or more traffic paths is assigned to one or more transport trails, an assigned traffic path may be re-routed to one or more other transport trails. The assigned traffic path may be re-routed based on a change in transport trail parameter information. The change in the transport trail information may be indicative of a change in a transport trail bandwidth or a change in transport trail reservation threshold.

In exemplary embodiments, after one or more traffic paths are assigned to one or more transport trails, traffic path optimization may be performed. Traffic path optimization may include evaluating one or more assigned traffic paths and transport trails and re-assigning any of the assigned traffic paths and transport trails based on traffic path parameter information and transport trail parameter information.

In other exemplary embodiments, a traffic path assignment process may be performed as follows. A traffic path may be selected (as described in greater detail hereinafter), and a determination may be made as to whether a suitable transport trail is available. If a suitable transport trail is available, a selected traffic path may be assigned to the suitable transport trail. If a suitable transport trail is not available, in exemplary embodiments, no traffic path is assigned. A notification indicating that no traffic path has been assigned may be generated. The generated notification may be a failure notification that may be transmitted within an exemplary embodiment of a system or outside of the system.

The description below describes systems, methods and modules, which may include one or more additional modules, some of which are explicitly shown in the figures and others that are not. As used herein, the term "module" may be understood to refer to computing software, firmware, hardware, circuitry and/or various combinations thereof. It is noted that the modules are merely exemplary. The modules may be combined, integrated, separated, and/or duplicated to support various applications. Also, a function described herein as being performed at a particular module may be performed at one or more other modules instead of or in addition to the function performed at the particular module shown. Further, the modules may be implemented across multiple devices and/or other components local or remote to one another. Additionally, the modules may be moved from one device and added to another device, and/or may be included in both devices.

It is further noted that the computer-readable medium described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the exemplary embodiments. Likewise, software and web implementations of the exemplary embodiments could be accomplished with standard programming techniques with rule based logic and other logic to accomplish the various steps.

It is further noted that the figures illustrate various components as separate entities from one another. The illustration of components as separate entities from one another is merely exemplary. The components may be combined, integrated, separated and/or duplicated to support various applications. Further, the functions described as being performed at various components may be performed at other components, and the various components may be combined and/or separated.

Figure 1:
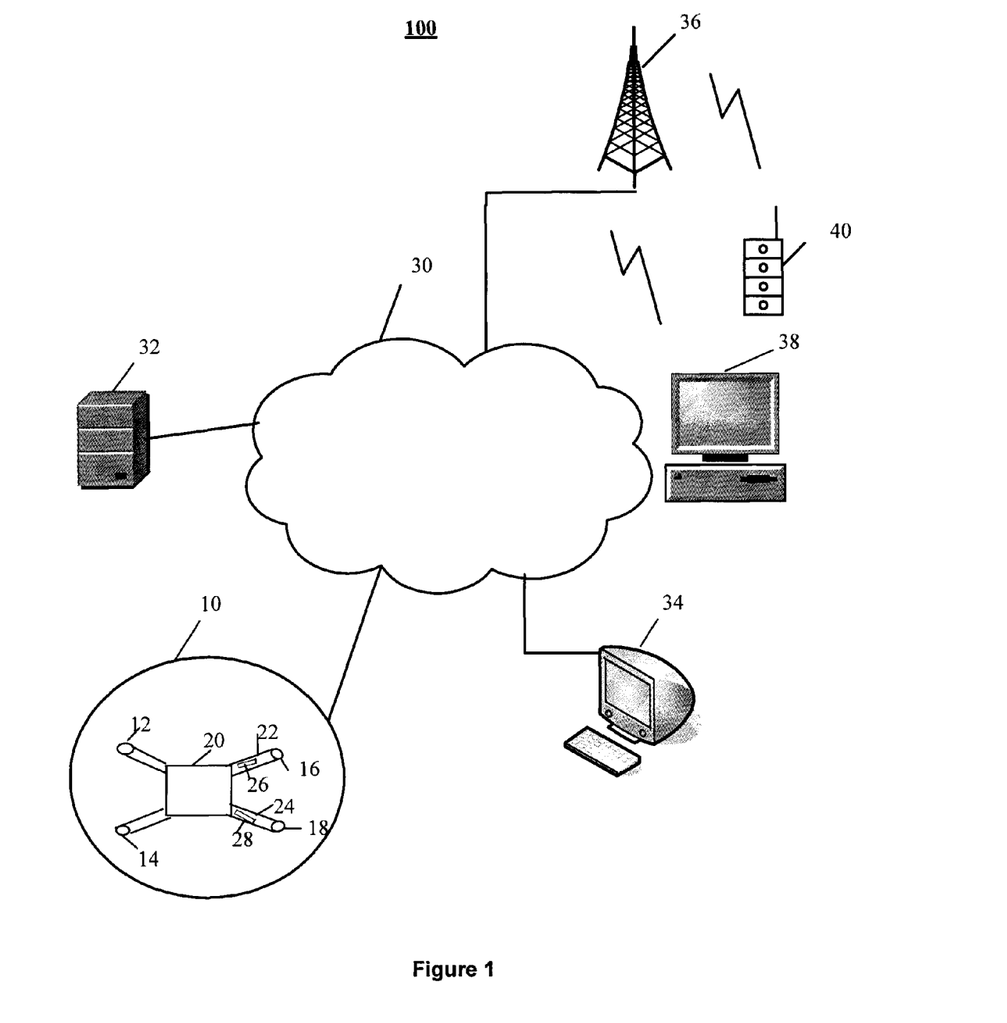
FIG. 1 is a schematic diagram of a system configured to provide multi-layer interworking in accordance with exemplary embodiments.

FIG. 1 is a schematic diagram of a system configured to provide multi-layer interworking in accordance with exemplary embodiments. As used herein, the term "interworking" means the ability for two or more protocols, systems, virtual layers or the like to operate with one another. As shown, system 100 may include a network 10 that includes one or more nodes 12, 14, 16, 18, an interworking module 20, one or more transport trails 22, 24 and one or more traffic paths 26, 28. System 100 also includes one or more communication devices configured to transport information. As shown, the devices include server 32, desktop computer 34, laptop 38 and cell phone 40. The system also includes a network 30 and a base station 36 for providing wireless communication to cell phone 40. Accordingly, system 100 may provide interworking for information transmitted between any of nodes 12, 14, 16, 18, which provide information that is controlled by interworking module 20, and any of devices 32, 34, 38, 40 shown in system 100.

Network 10 may be any of a number of different types of networks, including, but not limited to, a Wide Area Network ("WAN"), Local Area Network ("LAN"), the Internet, wireless, wired, infrared network, and/or any other network capable of providing functionality according to that typically associated with layers one, two and/or three of the Open Systems Interconnection ("OSI") model which is well known. At least a portion of network 10 complies with the International Telecommunication Union-Telecommunication ("ITU-T") standards recommendation working draft G.800 titled "Unified Functional Architecture of Transportation Networks," June 2007, which is incorporated herein by reference in its entirety. In exemplary embodiments, network 10 is a connection-oriented transport environment having transport trails 22, 24 established. In exemplary embodiments, the transport trails 22, 24 may be established before initiating interworking.

Nodes 12, 14, 16, 18 may be communicatively coupled to one another and configured to transmit information to or receive information from another node 12, 14, 16, 18 or a node outside of the network. Nodes 12, 14, 16, 18 may be any of different types of devices including, but not limited to, personal computers, mainframe computers, routers, switches, laptops, cellular telephones, PDAs, printers, scanners, or any other device capable of transporting information.

One or more traffic paths 26, 28 may overlay the one or more transport trails 22, 24. In exemplary embodiments, traffic paths are logical paths that transport information. Each of transport trails 22, 24 may be temporary or permanent virtual circuits established between any of nodes 12, 14, 16, 18, and may provide information between nodes 12, 14, 16, 18.

Each of traffic paths 26, 28 and transport trails 22, 24 may be defined by one or more traffic path parameters and by one or more transport trail parameters, respectively. The values of the traffic path parameters and the transport trail parameters may be indicative of the Quality of Service ("QOS") that may be provided to information being transmitted and/or received over the transport trail via the traffic path. Information indicative of the parameters and the values of the parameters may be passed to layers two and/or three protocols and systems performing functions characteristic of layers two and/or three of the OSI model. The parameters and the corresponding values may be provided to modules operating according to the Asynchronous Transfer Mode ("ATM") protocol, the Frame Relay protocol, the Open Shortest Path First ("OSPF") protocol, the Multi-Protocol Label Switching ("MPLS") technology or any other protocols or functionality that operates to perform one or more functions associated with layers two and/or three, including, but not limited to, transportation of information from a first node to a second node in the communication system, addressing and information routing, admission and rate control and quality of service provisioning. In exemplary embodiments, transportation of information may be provided at a desired QOS while reducing cost and complexity as compared to conventional protocols and technologies such as ATM, Frame Relay and MPLS.

The traffic path parameters may be one or more of a traffic path bandwidth requirement ("TPBW"), an over-subscription factor ("OF"), a placement priority ("PP") or a holding priority ("HP"), each of which are well-known in the art. In exemplary embodiments, the placement priority may be equal to or greater than the holding priority to avoid looping within a preemption process such as the preemption process described below wherein, before a traffic path can be assigned to a transport trail, assignment process is preempted for traffic paths that have a holding priority less than its corresponding placement priority.

The transport trail parameters may be one or more of a transport trail bandwidth ("TTBW"), a transport trail reservation threshold ("TTReservThresh") or a transport trail administrative cost ("TTAdminCost"). The transport trail reservation threshold may be indicative of a bandwidth and the bandwidth may be less than a total transport trail bandwidth. In exemplary embodiments, the transport trail reservation threshold may be indicated as a percentage of the transport trail bandwidth or as an absolute number. The transport trail administrative cost may be a parameter indicative of which transport trail a user may prefer for transport of information. In exemplary embodiments, the transport trail administrative cost may be a user-specified parameter. In exemplary embodiments, the transport trail administrative cost may be a relative term indicative of the transport trail that the user may prefer for transport of information. Accordingly, the relative term may express the user preference relative to any of a number of transport trails.

In exemplary embodiments, one or more of the transport trail bandwidth, the transport trail reservation threshold and the transport trail administrative cost or information indicative thereof may be utilized in systems operating according to features of the OSPF routing protocol. In exemplary embodiments, OSPF features such as the well-known equal-cost routing, multipath routing and type-of-service request routing may utilize one or more of the transport trail bandwidth, the transport trail reservation threshold and the transport trail administrative cost or information indicative thereof. The transport trail bandwidth, the transport trail reservation threshold and the transport trail administrative cost or information indicative thereof may be used to specify a particular level of service to be provided to or requested by the user.

Interworking module 20 may be communicatively coupled to each of nodes 12, 14, 16, 18 and configured to provide information to nodes 12, 14, 16, 18 via the one or more traffic paths 26, 28 and the one or more transport trails 22, 24. Interworking module 20 may be configured to provide interworking to control aspects of the transportation of information between nodes 12, 14, 16, 18. Interworking module 20 may be configured to assign one or more traffic paths 26, 28 to transport trails 22, 24.

Interworking module 20 may provide an optimal quantity and type of traffic path parameters and transport trail parameters. In one embodiment, the optimal quantity and type of traffic path parameters and transport trail parameters is six parameters, which are: traffic path bandwidth requirement, over-subscription factor, placement priority, holding priority, transport trail bandwidth, transport trail reservation threshold and transport trail administrative cost.

The traffic path parameters and transport trail parameters may be provided to a virtual layer that functions in a manner characteristic of layers two and/or three of the OSI model. The set parameters may be a more limited set than the conventional set of parameters provided to modules that operate to perform the functions of layers two and/or three protocols; however, a minimum amount of information may be provided by module 20. Accordingly, module 20 provides interworking between conventional virtual layers while reducing the complexity and associated cost of processing.

Figure 2:
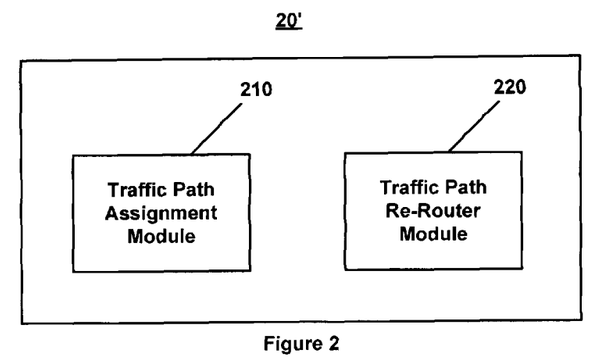
FIG. 2 is a schematic diagram of modules of the multi-layer interworking module of the system of FIG. 1 in accordance with exemplary embodiments.

FIG. 2 is a schematic diagram of exemplary modules of the interworking module of FIG. 1 in accordance with exemplary embodiments. As shown, interworking module 20' may make traffic path assignments and provide traffic path re-routing. The interworking module 20' may include traffic path assignment module 210 and traffic path re-routing module 220.

The traffic path assignment module 210 may assign one or more of traffic paths 26, 28 to one or more transport trails 22, 24. In exemplary embodiments, assigning one or more traffic paths 26, 28 to one or more transport trails 22, 24 may include the following steps. A traffic path may be selected from among one or more traffic paths. Whether a suitable transport trail is available may be determined. If a suitable transport trail is available, the selected traffic path may be assigned to the suitable transport trail.

Traffic path re-routing module 220 may provide re-routing of assigned traffic paths. In exemplary embodiments, re-routing of assigned traffic paths may include re-routing based on one or more of a change in transport trail bandwidth, a change in transport trail reservation threshold or a change in transport trail administrative cost.

In exemplary embodiments, traffic path re-routing module 220 may be configured to re-route traffic paths 26, 28 that are assigned to transport trails onto another of one or more transport trails based on a change in the bandwidth of the transport trail. In exemplary embodiments, traffic path re-routing module 220 may be configured to re-route traffic paths that are assigned to transport trails onto another of one or more of transport trails based on a change in the reservation threshold of the trail. In exemplary embodiments, traffic path re-routing module 220 may be configured re-route traffic paths that are assigned to transport trails onto another of one or more transport trails based on a change in the administrative cost of the trail. In an exemplary embodiment, a change in the transport trail administrative cost may not result in re-routing of traffic paths.

Figure 3:
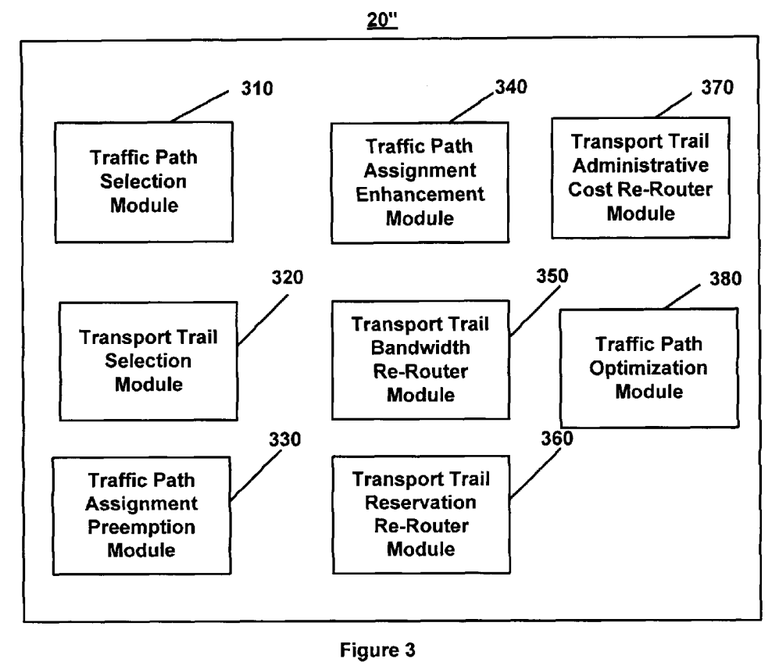
FIG. 3 is a schematic diagram of modules of the multi-layer interworking module of the system of FIG. 1 in accordance with exemplary embodiments.

FIG. 3 is a schematic diagram of exemplary modules of the interworking module of FIG. 1 in accordance with exemplary embodiments. As shown, interworking module 20" may provide traffic path selection, transport trail selection, traffic path assignment preemption, traffic path assignment enhancement, transport trail bandwidth re-routing, transport trail reservation re-routing and transport trail administrative cost re-routing.

The interworking module 20" may include the traffic path selection module 310, transport trail selection module 320, preemption module 330, enhancement module 340, transport trail bandwidth re-router module 350, transport trail reservation re-router module 360, and transport trail administrative cost re-router module 370. The traffic path selection module 310 may select a traffic path among one or more traffic paths. The transport trail selection module 320 may determine whether a suitable transport trail is available. If a suitable transport trail is available, module 320 may select the transport trail and assign the selected traffic path to the selected transport trail.

In another exemplary embodiment, the interworking module 20" may be configured to perform traffic path re-routing based on one or more of a change in the transport trail administrative cost, a change in a transport trail bandwidth or a change in a transport trail reservation threshold.

In the case of changes to the transport trail administrative cost, in exemplary embodiments, no traffic paths are re-routed. In exemplary embodiments, no traffic paths are re-routed in any cases wherein changes occur that do not affect the transport trail information capacity. By way of mere limitation, a change in the administrative cost to maintain the transport trail may not directly affect the trail's information-carrying capacity and therefore neither an increase nor a decrease in administrative cost prompts re-routing in exemplary embodiments.

In exemplary embodiments in which there is a change in the transport trail bandwidth, if the transport trail bandwidth increases or if the transport trail bandwidth decreases, and the decreased bandwidth ("DB") is less than or equal to the available bandwidth ("AB") for the transport trail, the assigned traffic paths may remain assigned to the current transport trail instead of being re-routed. A transport trail bandwidth may change due to any number of factors. In exemplary embodiments, a transport trail bandwidth may change based on the number or type of users in the system or accessing the transport trail or according to a setup configuration by which the system or transport trail operates. The setup may be external to the scope of the systems and methods disclosed herein but nevertheless cause limitations on the transport trail bandwidth due to the interaction between the systems and methods disclosed herein and the network and components thereof that are external to the systems and methods.

The decrease in the transport trail bandwidth may be described in absolute terms as shown above and indicated as "DB". The decrease in transport trail bandwidth may be described in absolute terms so that it may be compared with the available bandwidth.

Traffic path preemption (and subsequent traffic path re-routing) may occur if the following condition is met:

$$DB > AB.$$

Traffic path preemption for re-routing may occur as follows in exemplary embodiments. A preemptive bandwidth ("PreemptBW") may be calculated according to the following where the new trail bandwidth after the trail bandwidth changed is represented as NewTBW.

$$PreemptBW = \text{sum of all } ProvTPBW \text{ of traffic paths} - NewTBW*(1-TTReservThresh).$$

A re-routing bandwidth ("ReRouteBW") may be calculated according to the following:

$$ReRouteBW = \text{sum of all } ProvTPBW \text{ of traffic paths with same HP}$$

where ProvTPBW is provisioned traffic path bandwidth and HP is holding priority, as defined above.

The re-routing bandwidth may be calculated for all traffic paths with the same holding priority, starting with all of the traffic paths having the lowest holding priority. If the re-routing bandwidth is less than the pre-emptive bandwidth, the re-routing bandwidth may be re-calculated to include the sum of the provisioned traffic path bandwidth of traffic paths with the next higher holding priority. The process may be repeated until the re-routing bandwidth is greater than or equal to the pre-emptive bandwidth. If no calculations yield a re-routing bandwidth that is greater than or equal to the pre-emptive bandwidth, all traffic paths on the transport trail may be re-routed.

In exemplary embodiments, if the re-routing bandwidth is greater than or equal to the pre-emptive bandwidth, the traffic path re-routing process may be performed as follows. The traffic paths having the holding priority leading to the condition wherein re-routing bandwidth<pre-emptive bandwidth may be assigned to another transport trail. The new transport trail to which the traffic path may be assigned may be based on the holding priority and the traffic path bandwidth in descending order.

The module then provides traffic path assignment according to one or more of the exemplary embodiments described herein, including but not limited to, those processes performed at blocks 412 to 420 and 424 to 444 and the traffic path preemption process, with reference to FIGS. 4a, 4b and 4c, which are later discussed in detail. In exemplary embodiments, the process continues by performing re-routing every traffic path until the pre-emptive bandwidth is less than or equal to zero.

In exemplary embodiments, if a transport trail becomes available, it may be treated as a case of a transport trail decrease and all traffic paths on the transport trail may be re-routed.

With reference to FIGS. 2 and 3, one or more of traffic path re-router module 220, transport trail bandwidth re-router module 350, transport trail reservation re-router module 360 or transport trail administrative cost re-router module 370 may be enhanced by implementing traffic path bundling when performing the steps for traffic path re-routing. Traffic path bundling may speed the re-routing process and reduce the impact on the traffic; however, it may also cause sub-optimal traffic path placement and routing. In exemplary embodiments, the traffic path bundling may be provided via bundling on the logical paths that transport information.

Exemplary embodiments may also include modules for traffic path re-routing based on a change in a transport trail reservation threshold. In exemplary embodiments in which there is a decrease in the transport trail reservation threshold in exemplary embodiments, traffic path re-routing is not performed. In exemplary embodiments in which there is an increase in the transport trail reservation threshold, re-routing may be performed for the assigned traffic paths if the decreased bandwidth is less than or equal to the available bandwidth.

Traffic path preemption may occur if the decreased bandwidth is greater than the available bandwidth. Traffic path preemption may be performed according to the following process. Traffic path preemption for re-routing may occur as follows in exemplary embodiments. A preemptive bandwidth may be calculated according to the following where the new trail bandwidth after the trail bandwidth changed is represented as "New transport trail bandwidth":

Preempt$BW$=sum of all Prov$TPBW$ of traffic paths–
$NTBW$*(1–$TT$ReservThresh).

A re-routing bandwidth may be calculated according to the following:

ReRouteBW=sum of all ProvTPBW of traffic paths with the same HP.

The re-routing bandwidth may be calculated for all traffic paths with the same holding priority, starting with all of the traffic paths having the lowest holding priority. If the re-routing bandwidth is less than the pre-emptive bandwidth, the re-routing bandwidth may be re-calculated to include the sum of the provisioned traffic path bandwidth of traffic paths with the next higher holding priority. The process may be repeated until the re-routing bandwidth is greater than or equal to the pre-emptive bandwidth. If no calculations yield a re-routing bandwidth that is greater than or equal to the pre-emptive bandwidth, all traffic paths on the transport trail may be re-routed.

In exemplary embodiments, if the re-routing bandwidth is greater than or equal to the pre-emptive bandwidth, the traffic path re-routing process may be performed as follows. The traffic paths having the holding priority leading to the condition wherein re-routing bandwidth<pre-emptive bandwidth may be assigned to another transport trail. The new transport trail to which the traffic path may be assigned may be based on the holding priority and the traffic path bandwidth in descending order.

The module may continue processing with traffic path assignment. The assignment may be according and with reference to the steps of 412 to 420 and of 424 to 446 and FIGS. 4a, 4b and 4c and the traffic path preemption process that is part of the traffic path assignment module in exemplary embodiments. In exemplary embodiments, the module may re-route every traffic path until the pre-emptive bandwidth is less than or equal to zero.

In exemplary embodiments, a re-routing process may be provided wherein re-routing of traffic paths does not occur upon a change in transport trail reservation threshold. In this case of a change in a transport trail reservation threshold but no re-routing of assigned traffic paths, the transport trail may have a negative available bandwidth.

The preemption module 330 may be configured to preempt assignment of traffic paths to transport trails based on the administrative cost of the transport trail. The enhancement module 340 may assign to transport trails priority ranges indicative of the level of service that can be provided by the transport trail to enhance the probability that a desired level of service will be met.

The transport trail bandwidth re-router module 350 may be configured to re-route traffic paths 26, 28 that are assigned to transport trails onto another of one or more transport trails based on a change in the bandwidth of the transport trail.

The transport trail reservation re-router module 360 may be configured to re-route traffic paths that are assigned to transport trails onto another of one or more of transport trails based on a change in the reservation threshold of the trail.

The transport trail administrative cost re-router module 370 may be configured to re-route traffic paths that are assigned to transport trails onto another of one or more transport trails based on a change in the administrative cost of the trail.

In an exemplary embodiment, a change in the transport trail administrative cost may not result in re-routing of traffic paths. Re-routing may be performed in these cases according to periodic optimization. In an exemplary embodiment of periodic optimization, a user may specify whether the user desires a traffic path to be optimized based on the new transport trail administrative cost. In an exemplary embodiment, the user may specify that a traffic path should not be optimized notwithstanding a new transport trail administrative cost may be associated with the transport trail to which the traffic path is assigned. In an exemplary embodiment, the user may specify that a traffic path should be optimized for a new transport trail administrative cost. In an exemplary embodiment, the user may specify that a traffic path should be optimized for a new transport trail administrative cost of a selected amount or when the transport trail administrative cost changes by a selected amount. The selected amount may be selected before, during or after system operation and may be dynamically-changeable or static.

The interworking modules 20', 20" may also include a traffic path optimization module 380. The traffic path optimization module 380 may be configured to optimize the assignment of traffic paths on all of the existing transport trails.

In one exemplary embodiment, the traffic path optimization module 380 may be configured to evaluate assigned and unassigned traffic paths and transport trails and re-assign one or more traffic paths to one or more transport trails.

In another exemplary embodiment, the traffic path optimization module 380 may be configured to provide traffic path assignment enhancement. The traffic path optimization module 380 may provide a priority range for each transport trail. The priority ranges may relate to the level of service parameters that may be associated with information transported. The priorities may be a function of trail length, as very long transport trails may not be appropriate to transportation information having a level of service indicative of the information being delay-sensitive. The priorities may be a function of any aspect of the transport trail that may affect the level of service that can be provided on the transport trail. For example, a priority range may be assigned to a transport trail. Traffic paths having a priority range lower than the priority range of a transport trail may not be assigned to the transport trail. By way of example, but not limitation, the default priority range for a transport trail may be 1-20 and, a traffic path may have a priority range of 1-4. A trail not suitable for such a traffic path may be assigned a priority range higher than 1-4, such as 5-20. Traffic path optimization may be performed at selected intervals. The module may operate to perform traffic path optimization periodically.

Figure 4A:
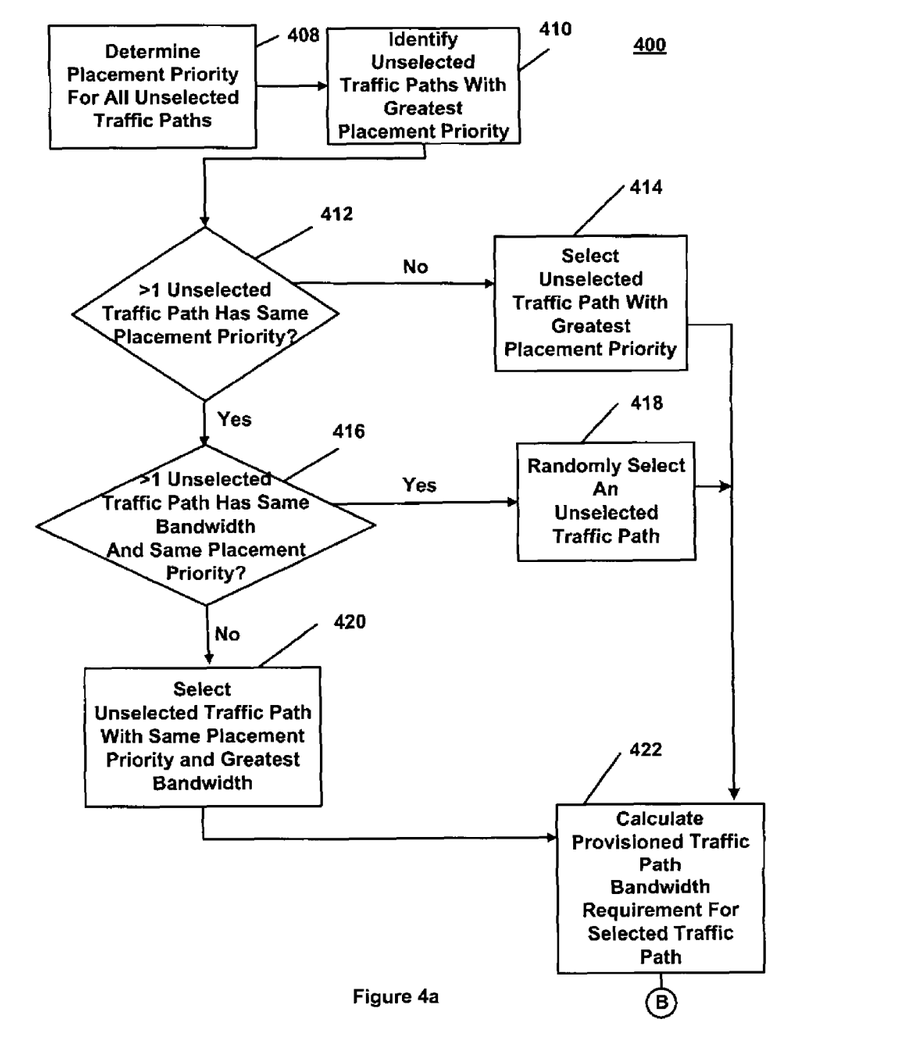
FIGS. 4a, 4b and 4c illustrate a flow chart of a method for traffic path assignment in accordance with exemplary embodiments.
Figure 4B:
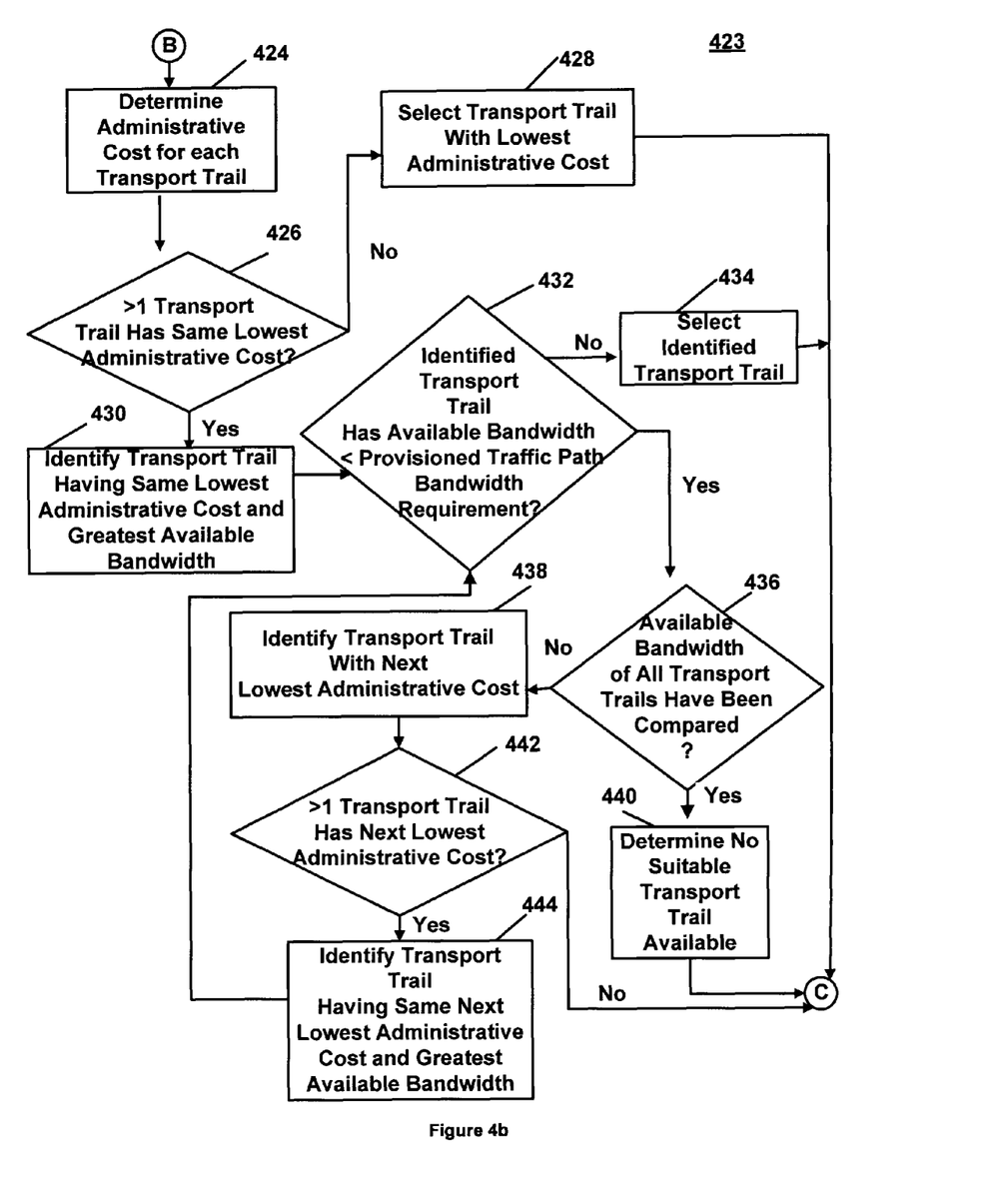
Figure 4C:
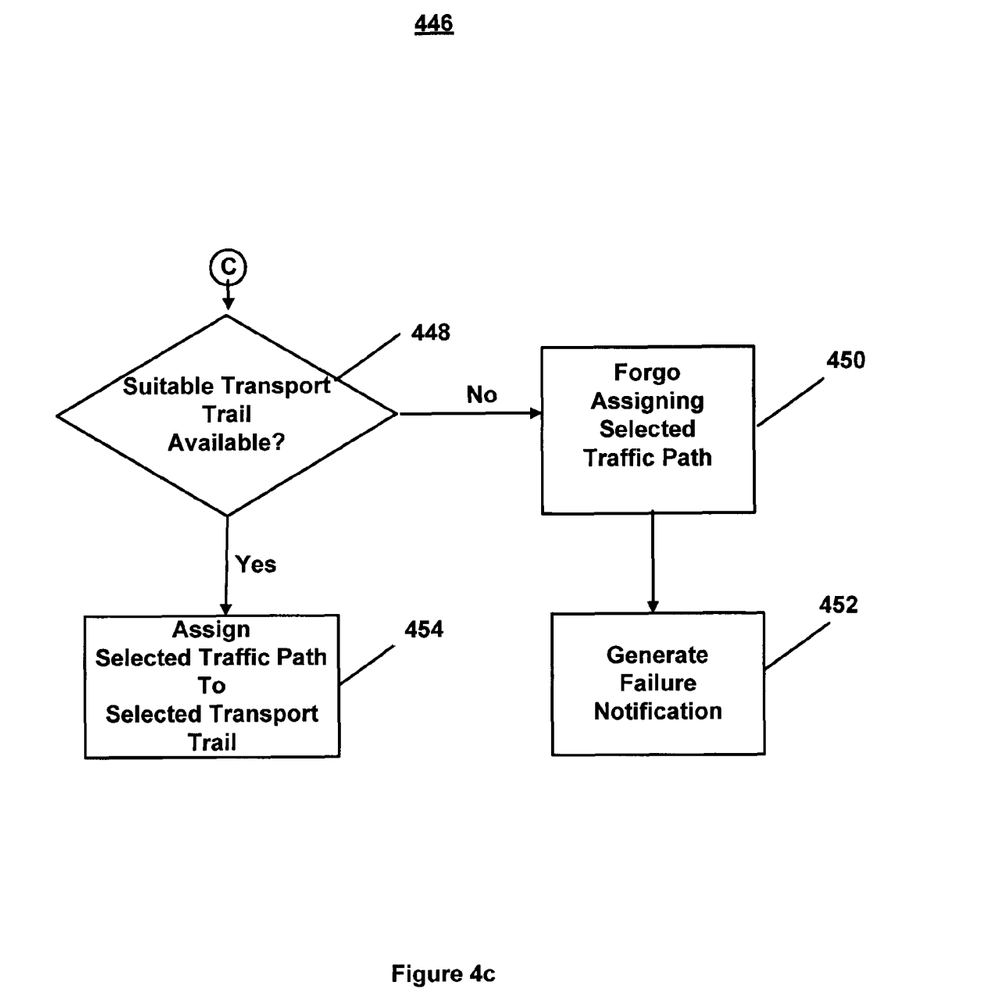

FIGS. 4a, 4b and 4c illustrate a flow chart of a method for traffic path assignment in accordance with exemplary embodiments. The exemplary embodiment is illustrated in FIGS. 4a, 4b and 4c as 400. As shown in FIGS. 4a, 4b and 4c, process 400 is not limited to requirement any particular structure for the performance of the process. In particular, the method may be executed or otherwise performed by one or a combination of various systems as the process steps are not limited to any particular type of structure, whether hardware or software. With regard to hardware, the processes may be performed by analog or digital circuitry such as that found in any number of devices, including, but not limited to, integrated circuits, an Application-Specific Integrated Circuit ("ASIC") chip designed specifically for interworking according to the process 400 one or more of the modules shown in FIGS. 1, 2 and 3 in embodiments 20, 20' and 20" or otherwise. With regard to software, the processes may be performed by computer program products including programming code that may be executed to perform the steps of the processes. The computer program products may be part of a module such as those shown in embodiments of interworking modules 20' and 20". The processes may be performed by any computer-readable medium having information stored on the medium for performing the steps of the method.

Referring to method 400, at block 408, placement priorities may be determined for all unselected traffic paths. In an exemplary embodiment, the placement priorities for unselected traffic paths may be transmitted from a memory (not shown) communicatively coupled to interworking module 20 and received by a receiver (not shown) and processed by a processor (not shown) at interworking module 20. The placement priorities are traffic path parameters and may be associated with information indicating a high priority placed on being assigned to a transport trail or a low priority placed on such assignment.

In block 410, the one or more traffic paths with the greatest placement priority is identified. In an exemplary embodiment, a processor at interworking module 20 may compare the parameters received at its receiver. In exemplary embodiments, the parameters may be considered to be the same if they are equal to or if they are within a determined range of one another. The determined range may be decided as a factor of the range of the entirety of the parameter values of the unselected traffic paths.

In block 412, whether more than one unselected traffic paths has the same placement priority may be determined. In an exemplary embodiment, a processor at interworking module 20 may compare the placement priorities received at its receiver. In exemplary embodiments, the parameters may be considered to be the same if they are equal to or if they are within a determined range of one another. The determined range may be decided as a factor of the range of the entirety of the parameter values of the unselected traffic paths.

In block 414, if not more than one traffic paths have the same placement priority, the traffic path is selected according to the identified traffic path with the greatest placement priority. In an exemplary embodiment, a processor at module 20 may compare the parameters received at its receiver. In exemplary embodiments, the parameters may be considered to be the same if they are equal to or if they are within a determined range of one another. The determined range may be decided as a factor of the range of the entirety of the parameter values of the unselected traffic paths.

In block 416, processing is performed if it is determined that more than one unselected traffic path has the same placement priority. In block 416, a determination is made as to whether more than one unselected traffic paths that have the same placement priority also have the same traffic path bandwidth. The determination may be made by a processor of the interworking module 20. In an exemplary embodiment, making the determination may include receiving the traffic path bandwidth requirements at the processor and comparing the requirements. In another exemplary embodiment, making the determination may include accessing some or all of the traffic path bandwidths at locations remote from interworking module 20, with reference to FIG. 1, including, but not limited to, locations on the network 30, a remote server (not shown) or otherwise. In exemplary embodiments, the parameters may be considered to be the same if they are equal to or if they are within a determined range of one another. The determined range may be decided as a factor of the range of the entirety of the parameter values of the unselected traffic paths.

In block 420, if more than one of the unselected traffic paths that have the same placement priority do not also have the same traffic path bandwidth, the traffic path having the greatest traffic path bandwidth requirement may be selected. Selection may be performed via storage of identifying information of a selected traffic path in a memory associated with interworking module 20. In exemplary embodiments, selection may be performed via any method allowing access to the information for performing the selection.

In block 418, if more than one of the unselected traffic paths that have the same placement priority also has the same traffic path bandwidth, an unselected traffic path is randomly selected. In an exemplary embodiment, the unselected traffic path may be randomly selected by a random number generator associated with interworking module 20 randomly picking a number and associating the number with an unselected traffic path.

In block 422, a provisional traffic path bandwidth requirement may be calculated according to the following:

$$Prov TPBW = TPBW/OverSubFactor$$

where TPBW is the traffic path bandwidth and OverSubFactor is the over-subscription factor, as defined above. In exemplary embodiments, the calculation may be performed by a processor at the interworking module 20 accessing information indicative of the traffic path bandwidth and over-subscription factor of the selected traffic path. An arithmetic and logic unit ("ALU") of interworking module 20 may calculate the provisioned traffic path bandwidth.

FIG. 4b illustrates the portion of method 400 corresponding to selecting a suitable transport trail. In block 424, the process determines the transport trail administrative cost for all transport trails. In an exemplary embodiment, the administrative costs for unselected traffic paths may be transmitted from memory (not shown) communicatively coupled to interworking module 20, received by a receiver (not shown) and processed by a processor (not shown) at interworking module 20. The administrative costs are traffic path parameters and may be associated with information indicating a high (or a low) cost to perform functions for maintaining the integrity of the transport trail. In exemplary embodiments, determining administrative costs may include a transmitter of the network module transmitting request to an information source able to provide one or more pieces of information that may be used to calculate the administrative costs for each transport trail. In exemplary embodiments, the administrative costs may be received at a processor of interworking module 20.

In block 426, a determination is made as to whether more than one transport trail has the same transport trail administrative cost. The determination may be made by a processor of the interworking module 20. In an exemplary embodiment, making the determination may include interworking module 20 requesting from a server in the system of FIG. 1 information indicative of the administrative costs of the transport trails, the server responding by sending the information and the interworking module 20 comparing the results received at the receiver of the module. In exemplary embodiments, the parameters may be considered to be the same if they are equal to or if they are within a determined range of one another. The determined range may be decided as a factor of the range of the entirety of the parameter values of the unselected traffic paths.

In block 428, if not more than one transport trail has the same administrative cost, the transport trail with the lowest administrative cost may be selected and determined to be a suitable transport trail to which the selected traffic path can be assigned.

In block 430, if more than one transport trail has the same administrative cost, the transport trail with the greatest available bandwidth may be identified. For example, the identification may be performed in the processor of the module. In exemplary embodiments, the parameters may be considered to be the same if they are equal to or if they are within a determined range of one another. The determined range may be decided as a factor of the range of the entirety of the parameter values of the transport trails.

In exemplary embodiments, the available bandwidth may be performed a comparison of the available bandwidth for each transport trail according to the following:

$$AB = TTBW*(1 - TTReservThresh)$$

or $$AB = TTBW - TTReservThresh$$

where TTBW is the transport trail bandwidth and TTReservThresh is the transport trail reservation threshold, as defined above. The available bandwidth may be calculated by an ALU at interworking module 20.

Available bandwidth can be calculated using the following formula when there is a traffic path being carried on the transport trail:

$$AB = TTBW(1 - TTReservThresh) - \text{sum of all } ProvTPBW \text{ of all traffic paths having a higher and equal HP than the PP of the traffic path that is selected for assignment to the transport trail.}$$

In block 432, a determination is made as to whether the identified transport trail has an available bandwidth that is less than provisioned traffic path bandwidth for the selected traffic path. In an exemplary embodiment, the determination may be made by comparing the available bandwidth and the provisioned traffic path bandwidth in a processor of the module. In another exemplary embodiment, the determination includes calculating the provisioned traffic path bandwidth and comparing the parameters after identifying a potential suitable transport trail.

In block 434, the identified transport trail is selected if the identified transport trail has an available bandwidth that is not less than the provisioned traffic path bandwidth requirement. In an exemplary embodiment, the selection may be made by storing information associated with the identity of the identified transport trail in a memory at interworking module 20.

In block 436, a determination is made as to whether the available bandwidths of each of the transport trails have been compared with the provisioned traffic path bandwidth requirement. In exemplary embodiments, the determination may be made by maintaining information accessible by interworking module 20 and indicative of the transport trails for which a comparison of their available bandwidth has been performed. The information may be compared against information indicative of all transport trails of which interworking module 20 is aware. In exemplary embodiments, a memory of interworking module 20 may store information indicative of the transport trails and the results of the comparisons.

In block 438, the transport trail with the next lowest administrative cost is identified if all transport trails have not been considered. For example, the identification may be performed in the processor of the module. In exemplary embodiments, the parameters may be considered to be the same if they are equal to or if they are within a determined range of one another. The determined range may be decided as a factor of the range of the entirety of the parameter values of the transport trails.

In block 442, a determination is made as to whether more than one transport trail has the same next lowest transport trail administrative cost. The determination may be made by a processor of the interworking module 20. In an exemplary embodiment, making the determination may include interworking module 20 requesting from a server in the system of FIG. 1 information indicative of the administrative costs of the transport trails, the server responding by sending the information and the interworking module 20 comparing the results received at the receiver of the module. In exemplary embodiments, the parameters may be considered to be the same if they are equal to or if they are within a determined range of one another. The determined range may be decided as a factor of the range of the entirety of the parameter values of the unselected traffic paths.

In block 444, if more than one transport trail has the same lowest administrative cost, the transport trail with the greatest available bandwidth may be identified. For example, the identification may be performed in the processor of the module. In exemplary embodiments, the available bandwidth may be performed by a comparison of the available bandwidth for each transport trail. The available bandwidth may be calculated by an ALU at interworking module 20. In exemplary embodiments, the parameters may be considered to be the same if they are equal to or if they are within a determined range of one another. The determined range may be decided as a factor of the range of the entirety of the parameter values of the transport trails.

The process may then perform the steps at block 432 and continue the process in accordance with the result of the determination at block 432. Accordingly, the process for determining whether there is a suitable transport trail may be an iterative process. The process may include steps to evaluate transport trails based on their one or more transport trail parameters to determine the suitability of the transport trail for a selected unassigned traffic path.

In block 440, if all transport trails have been considered and no transport trails have been selected at blocks 428 or 434, a determination may be made that there are no suitable transport trails.

FIG. 4c illustrates a portion of method 400 of assigning the selected traffic path to a suitable transport trail. The process continues from steps 440 (or alternately, step 428) illustrated in FIG. 4b.

In block 448, a determination is made as to whether a suitable transport trail was identified as available. The determination may be made by reference to a memory of interworking module 20 where information indicative of such identification may be stored and accessed by the processor associated with interworking module 20.

In block 450, if a suitable transport trail was not identified, a determination may be made to forgo assigning the selected traffic path to a transport trail. The determination may be performed through circuitry such as that of simple logic gates designed to output a signal indicative of whether interworking module 20 should forgo assigning the selected traffic path to the transport trail.

In block 452, a notification indicative of the lack of a suitable transport trail may be generated. In exemplary embodiments, the notification is a failure notification. The notification may be received by a mechanism configured for monitoring the network 10, interworking module 20 or system 100. In exemplary embodiments, the notification may be received by an operator disposed to obtain information received at any of the aforementioned locations. In exemplary embodiments, the notification may be received by a node associated with the selected traffic path that was waiting to be assigned to a transport trail.

In block 454, if a suitable transport trail is available, the process may assign the selected traffic path to the suitable, i.e., selected transport trail. The traffic path may be assigned to the selected transport trail by interworking module 20 associating the traffic path on the transport trail. In exemplary embodiments, a port associated with a transport trail may be configured to receive traffic transmitted in association with the traffic path.

Process 400 may further include a preemption process. Preemption may be performed between assignments of selected traffic paths to selected suitable transport trails. In these embodiments, preemption may be performed before any new traffic path can be considered for assignment to a suitable transport trail. The preemption process may include evaluating each assigned traffic path to determine whether any of the assigned traffic paths have a holding priority that may be less than its corresponding placement priority. Preemption may be performed with on any assigned traffic paths that have a holding priority that may be less than its corresponding placement priority. During preemption, the assigned traffic paths may be removed from the transport trail and evaluated to determine if they will be assigned to a transport trail again. The process may be analogous to the process described in steps 412 to 420 and in steps 424 to 446, but the processes may be applied to the preempted traffic paths instead of applying the processes to unselected traffic paths, and may be only performed to evaluate transport trails on which a transport trail administrative cost is equal to or greater than the current transport trail on which the traffic paths may be assigned. In an exemplary embodiment, the lower the value of the transport trail administrative cost, the higher priority the transport trail may receive in a route selection process in which the transport trail is included. In an exemplary embodiment, if a first transport trail has a transport trail administrative cost of one and a second transport trail has a transport trail administrative cost of ten, the first transport trail will be selected before the second transport trail. The first transport trail will be selected before the second transport trail until the first transport trail is full, and after the first transport trail is full, the second transport trail may then be selected. In exemplary embodiments, selection of transport trails or methods employed therein may incorporate selection methods of OSPF.

The preemption process may continue until all preempted traffic paths on all impacted transport trails may be assigned. The preemption process continues with generation of information indicative of the traffic path indicating that it may be ready for payload traffic.

After preemption, a second unassigned traffic path may be assigned according to the steps of 412 to 420 and 424 to 444 and the steps outlined in the preemption process. The steps of 412 to 420 and 424 to 444 and the steps outlined in the preemption process may be performed in an iterative manner to assign traffic paths to transport trails.

It will be appreciated that the above described embodiments can be applied to advantage in numerous real world applications.

For example, exemplary embodiments can be used to solve the well known parallel trunking congestion problem in MPLS TE enabled backbone networks. In today's MPLS backbone, three common methods are used to manage traffic on parallel trunks between two routers. Two of the three methods bundle the parallel trunks together into one aggregated logical trunk. The first of these two methods uses Layer 1 technology known as Link Aggregation Group (LAG), while the second utilizes MPLS Link Bundling. Both methods utilize logical addressing (VLAN, IP Address, DLCI, etc.) for traffic distribution among multiple link members. Consequently, traffic balance and performance objectives cannot be achieved because those technologies do not recognize LSP bandwidth and or QoS settings. The third known method is to use parallel trunks as they are (i.e., separate and independent of each other). This causes another set of problems. For example, where primary LSPs are balanced among multiple parallel trunks using MPLS TE, bypass tunnel placement cannot be balanced unless bandwidths are assigned to those bypass tunnels. However, doing so wastes valuable backbone resources, and placing bypass tunnels without assigning bandwidths can result in traffic drop during failure recovery even though there is ample capacity in the backbone. Advantageously, embodiments described herein allow parallel trunks to be bundled together as a single logical trunk. Consequently, CTG systems implemented in accordance with these embodiments can handle the traffic engineering requirements of MPLS networks, while also accommodating link restoration and recovery during link member failure.

Exemplary embodiments can also be used to solve the well known Inter-Autonomous System (Inter-AS) Interworking Performance and Efficiency Problem in data networks. In this context, note that Multi-Protocol Gateway (MPG), MPLS VPN Inter-provider Gateway (MVIC), and Network-to-Network Interface (NNIs or back-to-back UNIs) are the most popular technology choices for inter-carrier connections and inter-AS interworking in today's data networks including MPLS, ATM, and Frame Relay networks. However, each of these choices has significant limitations. For example, for MPG, diversity and service restoration can be achieved in three ways (i.e., pre-built primary and secondary paths; reliance upon path crank back; or reliance upon Layer 1 transport technology for restoration such as SONET ring and/or Link Aggregation Group), but each of the three techniques has drawbacks (e.g., with pre-built paths, the secondary path captures network resources and increases network cost, and because the secondary path must be computed after the primary path is established, the network may not be able to find a diverse secondary path or the secondary path may be suboptimal; with path crank back, service restoration can be quite slow; and with reliance on Layer 1 transport technology, network costs are significantly increased). These same problems exist for MVIC as well. Moreover, for NNIs or back-to-back UNIs, there usually are no layer 2 diversity or service restoration capabilities, and diversity and service restoration often depends on a Layer 1 transport layer technology such as SONET ring and/or LAG. Advantageously, embodiments described herein can remedy all of these deficiencies. For example, as will be appreciated by those of ordinary skill, a CTG system implemented in accordance with exemplary embodiments can be used as a supplemental technology to solve the diversity and service restoration problem of MPG. Moreover, coupled with MPG, CTG implemented in accordance with exemplary embodiments can be used as a replacement technology for MVIC as will be appreciated. With respect to NNIs and back-to-back UNIs, a CTG system implemented in accordance with exemplary embodiments can be built between Autonomous System Border Router (ASBR) gateways to replace the above mentioned technologies, as will be appreciated.

Exemplary embodiments can also be used to provide flexible network trunking solutions for data networks. For example, as will be appreciated, a CTG system implemented in accordance with exemplary embodiments can bundle different physical interfaces and provide a single logical interface for a network to use as an aggregated trunk at higher speed. For example, 2 GEs, 2 OC3s, and 1 DS3 can be bundled for an OC48 (2.5 Gbps) equivalent. Moreover, a CTG arrangement constructed in accordance with exemplary embodiments allows a carrier to maximize use of existing facilities, especially in regions such as Asia Pacific where capacity demand is high, but high speed transports are presently rare. Advantageously, CTG systems according to exemplary embodiments can bundle link members with different performance objectives into a single logical interface for the network to use as an aggregated trunk at higher speed. For example, it can bundle 2 DS3s where RTD is 150 ms and multiple DS1s where RTD is 80 ms into an aggregated OC3 equivalent. This can be especially useful in regions (e.g., certain portions of present day Latin America) where traffic between two countries is heavy, but transport facilities directly between those countries are rare.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   selecting a traffic path from one or more traffic paths with each traffic path having traffic path parameter information and the selected traffic path being based on the associated traffic path parameter information;
   selecting a first transport trail from one or more transport trails with each transport trail comprising at least one of a temporary virtual circuit and a permanent virtual circuit and having associated transport trail parameter information comprising one or more of a transport trail bandwidth, a transport trail reservation threshold, and a transport trail administrative cost, the first selected transport trail being based on the associated transport trail parameter information;
   assigning the selected traffic path to the first selected transport trail if the first selected transport trail is determined to be suitable for assignment;
   preempting the assignment of the selected traffic path to the first selected transport trail in response to a change in at least one of the transport trail bandwidth parameter, the transport trail reservation threshold parameter, and the transport trail administrative cost parameter associated with the first selected transport trail;
   selecting a second transport trail from the one or more transport trails and the second selected transport trail being based on associated transport trail parameter information; and
   assigning the selected traffic path to the second selected transport trail if the second selected transport trail is determined to be suitable for assignment;
   wherein the traffic path parameter information comprises one or more of a traffic path bandwidth, an over-subscription factor, a placement priority or a holding priority.

2. The method of claim 1, wherein the placement priority associated with the selected traffic path is higher than the placement priority associated with any of the other traffic paths.

3. The method of claim 1, further comprising calculating a provisioned bandwidth requirement for the selected traffic path.

4. The method of claim 3, wherein calculating the provisioned bandwidth requirement comprises dividing the traffic path bandwidth by the over-subscription factor.

5. The method of claim 4, wherein the second selected transport trail is determined to be a suitable transport trail if the transport trail parameter information associated with the second selected transport trail is indicative of the second selected transport trail having a bandwidth that is greater than the provisioned bandwidth requirement.

6. The method of claim 1, wherein the transport trail administrative cost associated with the second selected transport trail is lower than the transport trail administrative cost associated with any of the other traffic paths.

7. The method of claim 1, wherein the second selected transport trail is determined to be suitable if the transport trail parameter information associated with the second selected transport trail is indicative of the second selected transport trail having a bandwidth that is greater than a bandwidth required by the selected traffic path.

8. A non-transitory computer readable medium having an executable computer program comprising instructions to perform steps of the method of claim 7.

9. A non-transitory computer readable medium having an executable computer program comprising instructions to perform steps of the method of claim 1.

10. An interworking system comprising:
a traffic path selection computing apparatus configured to select a traffic path from one or more traffic paths;
a transport trail selection computing apparatus configured to select a first suitable transport trail from one or more transport trails, and assign the selected traffic path to the first selected transport trail if the first selected transport trail is determined to be suitable for assignment;
a preemption computing apparatus configured to preempt the assignment of the selected traffic path to the first selected transport trail in response to a change in transport trail parameter information associated with the first selected transport trail, wherein the transport trail parameter information comprises one or more of a transport trail bandwidth, a transport trail reservation threshold, and a transport trail administrative cost; and
the transport trail selection computing apparatus configured to select a second suitable transport trail from the one or more transport trails, and assign the selected traffic path to the second selected transport trail if the second selected transport trail is determined to be suitable for assignment,
wherein each transport trail comprises at least one of a temporary virtual circuit and a permanent virtual circuit.

11. An interworking system comprising:
a traffic path selection computing apparatus configured to select a traffic path from one or more traffic paths;
a transport trail selection computing apparatus configured to select a first transport trail from one or more transport trails, and assign the selected traffic path to the first selected transport trail if the first selected transport trail is determined to be suitable for assignment, wherein each transport trail comprises at least one of a temporary virtual circuit and a permanent virtual circuit;
a preemption computing apparatus configured to preempt assignment of the selected traffic path to the first selected transport trail in response to a change in transport trail parameter information associated with the first selected transport trail, wherein the transport trail parameter information comprises one or more of a transport trail bandwidth, a transport trail reservation threshold, and a transport trail administrative cost;
an enhancement computing apparatus configured to assign to one or more transport trails priority ranges indicative of a level of service that is provided by the one or more transport trails; and
a traffic path re-router computing apparatus configured to re-route the selected traffic path from the first selected transport trail onto one of the other transport trails based on a change in the transport trail parameter information associated with the first selected transport trail.

12. An interworking system comprising:
a computing apparatus configured to identify level of service parameter information indicative of information for transport;
a computing apparatus configured to identify communication channel parameter information indicative of one or more resources of the communication channel, wherein the communication channel parameter information is associated with at least one of a temporary virtual circuit and a permanent virtual circuit;
a computing apparatus configured to provide an identified level of service parameter information and an identified communication channel parameter information to a communication protocol configured to transport information;
a traffic path assignment computing apparatus configured to:
select a traffic path from one or more traffic paths;
select a first transport trail from one or more transport trails,
wherein each transport trail comprises at least one of a temporary virtual circuit and a permanent virtual circuit, assign the selected traffic path to the first selected transport trail,
wherein assigning the selected traffic path to the first selected transport trail is based on the identified level of service parameter information and the identified communication channel parameter information;
a preemption computing apparatus configured to:
preempt the assignment of the selected traffic path to the first selected transport trail in response to a change in at least one of the identified level of service parameter information and the identified communication channel parameter information,
select a second transport trail from the one or more transport trails; and the traffic path assignment computing apparatus further configured to:
assign the selected traffic path to the second selected transport trail if the second selected transport trail is determined to be suitable for assignment.

13. The interworking system of claim 12, wherein the level of service parameter information comprises one or more of: a traffic path bandwidth, an over-subscription factor, a placement priority or a holding priority, and wherein the communication channel parameter information comprises one or more of: a transport trail bandwidth, a transport trail reservation threshold or a transport trail administrative cost.

14. The interworking system of claim 12, wherein the communication protocol is Asynchronous Transfer Mode.

15. The interworking system of claim 12, wherein the communication protocol is Frame Relay.

16. The interworking system of claim 12, wherein the communication protocol is Multi-protocol Label Switching.

17. A system comprising:
a computing apparatus configured to provide a communication protocol to transport information; and
an interworking computing apparatus comprising:
a computing apparatus configured to identify level of service parameter information indicative of information for transport;
a computing apparatus configured to identify communication channel parameter information indicative of one or more resources of the communication channel;
a computing apparatus configured to provide an identified level of service parameter information and an identified communication channel parameter information to the communication protocol;
a traffic path assignment computing apparatus configured to:
select a traffic path from one or more traffic paths;
select a first transport trail from one or more transport trails, wherein each transport trail comprises at least one of a temporary virtual circuit and a permanent virtual circuit,
assign the selected traffic path to the first selected transport trail,
wherein assigning the selected traffic path to the first selected transport trail is based on the identified level of service parameter information and the identified communication channel parameter information;
a preemption computing apparatus configured to:
preempt the assignment of the selected traffic path to the first selected transport trail in response to a change in at least one of the identified level of service parameter information and the identified communication channel parameter information,
select a second transport trail from the one or more transport trails; and
the traffic path assignment computing apparatus further configured to:
assign the selected traffic path to the second selected transport trail if the second selected transport trail is determined to be suitable for assignment.

18. The system of claim 17, wherein the level of service parameter information comprises one or more of: a traffic path bandwidth, an over-subscription factor, a placement priority or a holding priority, and wherein the communication channel parameter information comprises one or more of: a transport trail bandwidth, a transport trail reservation threshold or a transport trail administrative cost.

\* \* \* \* \*